United States Patent

Koncsek et al.

[11] Patent Number: 5,490,644
[45] Date of Patent: Feb. 13, 1996

[54] DUCTED BOUNDARY LAYER DIVERTER

[75] Inventors: Joseph L. Koncsek, Seattle; Steven L. McMahon, Lake Stevens, both of Wash.

[73] Assignee: The Boeing Company, Seattle, Wash.

[21] Appl. No.: 170,129

[22] Filed: Dec. 20, 1993

[51] Int. Cl.⁶ ............................. B64D 29/04; B64C 21/02
[52] U.S. Cl. ..................... 244/53 B; 244/204; 244/209; 137/15.1
[58] Field of Search ................... 244/53 B, 130, 244/200, 204, 209, 210; 137/15.1, 15.2

[56] References Cited

U.S. PATENT DOCUMENTS

| | | | |
|---|---|---|---|
| 3,095,166 | 6/1963 | Briggs, Jr. .................... | 244/53 |
| 3,578,265 | 5/1971 | Patierno et al. ............... | 244/42 |
| 3,664,612 | 5/1972 | Skidmore et al. ............. | 244/53 B |
| 3,806,067 | 4/1974 | Kutney ........................ | 244/53 R |
| 3,960,345 | 6/1976 | Lippert, Jr. .................. | 244/130 |
| 4,033,526 | 7/1977 | Benson ........................ | 244/209 |
| 4,132,240 | 1/1979 | Frantz ......................... | 244/53 B |
| 4,397,431 | 8/1983 | Ben Porat .................... | 244/53 B |
| 4,418,879 | 12/1983 | Vanderleest ................. | 244/53 B |
| 4,466,587 | 8/1984 | Dusa et al. ................... | 244/121 |
| 4,482,114 | 11/1984 | Gupta et al. .................. | 244/53 B |
| 4,489,905 | 12/1984 | Bengelink et al. ............ | 244/130 |
| 4,993,663 | 2/1991 | Lahti et al. ................... | 244/53 B |
| 5,078,341 | 1/1992 | Bichler et al. ................ | 244/53 B |
| 5,114,103 | 5/1992 | Coffinberry .................. | 244/209 |
| 5,141,182 | 8/1992 | Coffinberry .................. | 244/204 |

FOREIGN PATENT DOCUMENTS 0413948  7/1934  United Kingdom ............... 244/209

*Primary Examiner*—Andres Kashnikow
*Assistant Examiner*—Virna Lissi Mojica
*Attorney, Agent, or Firm*—Christensen, O'Connor, Johnson & Kindness

[57] ABSTRACT

Boundary layer control apparatus is provided (22). The boundary layer control apparatus (22) is for use with an aircraft propulsion nacelle (12) positioned such that the air inlet (14) of the propulsion nacelle is located proximate an aircraft surface (10), wherein a boundary layer is established on the surface when the aircraft is propelled through an atmosphere, causing air to flow over the surface. The boundary layer control apparatus (22) includes a duct having an entrance (24) positioned between the aircraft surface (10) and the inlet (14) of the propulsion nacelle (12) for capturing the boundary layer air passing over the aircraft surface and diverting the boundary layer air away from the inlet.

20 Claims, 3 Drawing Sheets

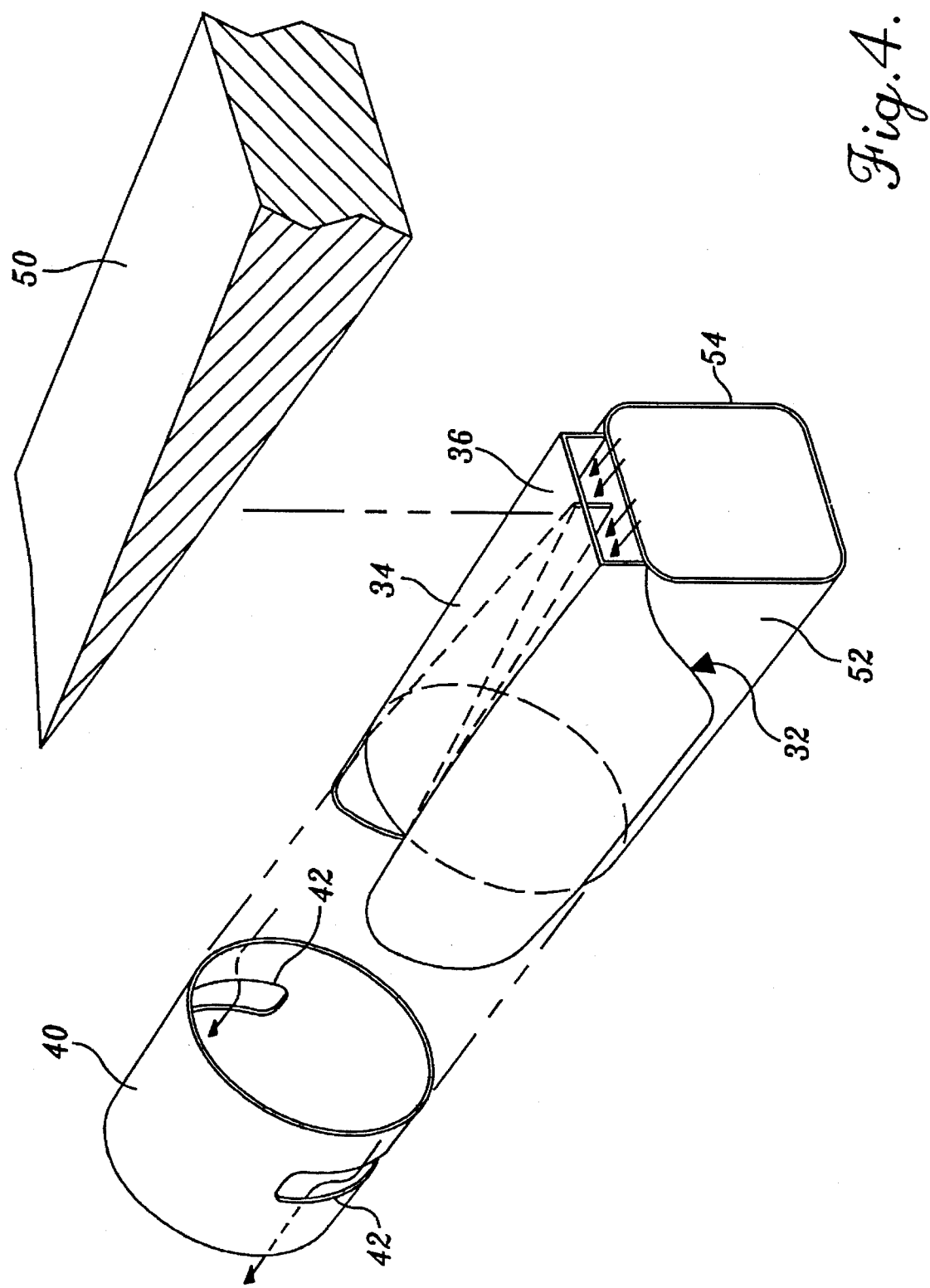

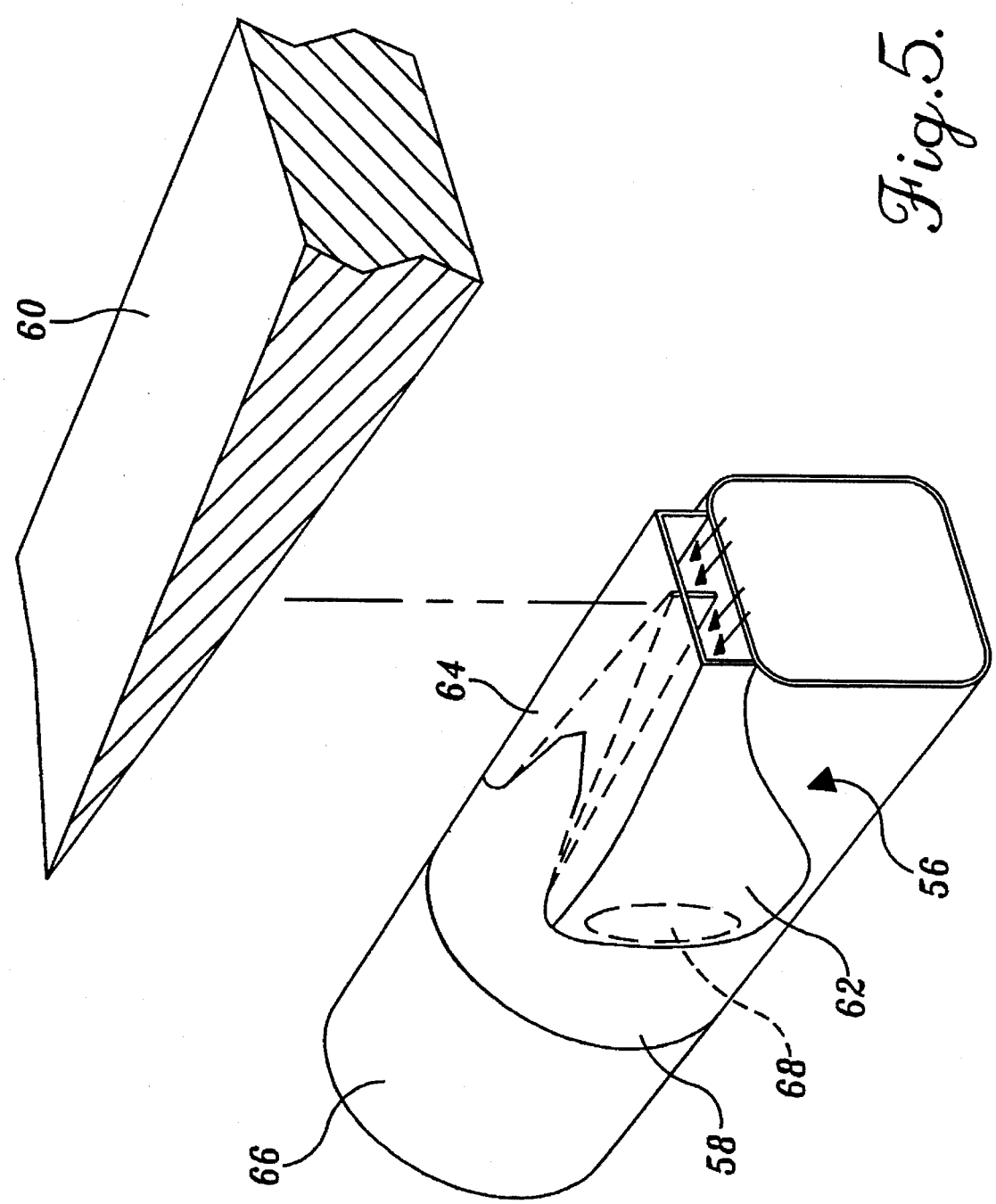

DUCTED BOUNDARY LAYER DIVERTER

FIELD OF THE INVENTION

This invention generally relates to the diversion of boundary layer air in aircraft and more particularly to the diversion of boundary layer air away from the entrance of an aircraft propulsion nacelle.

BACKGROUND OF THE INVENTION

It is well known that the velocity of an air flow close to the surface of an airfoil or other object is significantly less than the velocity of the air flow at a spaced-apart location from the object, whereat the velocity is measured relative to the object. The region of reduced air flow velocity along and near the surface, termed the boundary layer, is the result of viscous drag between the air flow and the surface. In contrast, the region of air farther from the surface where the velocity is substantially unaffected by the surface is called the free stream.

To achieve optimum performance, modern aircraft propulsion systems, namely jet engines, require an incoming flow of air at the propulsion nacelle, or pod inlet, which is substantially lacking in a boundary layer. The problem with this requirement is that the inlet of a propulsion nacelle is often located adjacent to another surface of the associated airplane. This is particularly true in high velocity (i.e., supersonic) airplanes, such as commercial supersonic transport airplanes, military jet fighters, combat support airplanes, and bombers. When the air flows across a surface adjacent to the inlet of a propulsion nacelle, a boundary layer of lower velocity air is formed. The lower velocity boundary layer air, along with higher velocity free stream air, flows into the inlet of the propulsion nacelle. As a result, some of the air flow into the engine is boundary layer air. Because the momentum of boundary layer air is lower than the momentum of free stream air, engine performance is decreased.

One attempted solution to this problem has been to space the inlet of the propulsion nacelle away from the adjacent surface a distance approximately equal to the thickness of the adjacent surface boundary layer using a pylon or strut, termed a diverter. Thus, the boundary layer impacts the diverter, rather than entering the inlet. Typically the diverter is aerodynamically contoured to smoothly redirect the boundary layer away from the inlet.

Although satisfactory in some cases, the use of a pylon or strut diverter has two principal drawbacks. First, the diverter increases drag by increasing the cross-sectional area presented to the oncoming air flow. Second, at supersonic speeds, the diverter is especially disadvantageous because a shock wave forms in front of the diverter, which significantly increases drag.

Another proposed solution is shown in U.S. Pat. No. 3,578,265 to Patierno et al. Patierno et al. disclose slots formed through the portion of the wing that attaches to the fuselage of an airplane. Boundary layer air flowing along the fuselage passes through the slots, rather than into the propulsion nacelle inlets, wherein the propulsion nacelle inlets extend outwardly from the fuselage, underneath each wing.

There are several drawbacks to the proposed solution described in the Patierno et al. patent. First, the slots reduce the maximum lift available from the wings. Second, while some of the boundary layer air flowing along the fuselage may pass through the slots, a significant portion still flows into the propulsion nacelle inlets. Third, the solution only works with airplanes having propulsion nacelle inlets positioned underneath the wings. Finally, related to the last point, no provision is made for boundary layer air flowing along the underside of the wings. Provision is only made for boundary layer air thinning along the fuselage.

Another proposed solution, often termed boundary layer bleed, is to form apertures in the vehicle surface and apply a partial vacuum to the apertures. The vacuum draws boundary layer air into the interior of the vehicle through the apertures, rather than allowing the boundary layer air to flow into the propulsion nacelle inlet. Alternatively, the apertures are formed such that pressure applied to the apertures causes high velocity air to be injected along the vehicle surface, often termed boundary layer blowing. The high velocity air mixes with the boundary layer, re-energizing the boundary layer. A disadvantage with both of these approaches is that ultimately the engine must supply the energy required to apply vacuum or pressure to the apertures. Thus, any increase in engine performance produced by either approach is offset by the additional energy required to be produced by the engine.

SUMMARY OF THE INVENTION

In accordance with the present invention, a boundary layer control apparatus is provided. The boundary layer control apparatus is for use with an aircraft propulsion nacelle positioned such that the air inlet of the propulsion nacelle is located proximate an aircraft surface, wherein a boundary layer is established on the surface when the aircraft is propelled through an atmosphere, causing air to flow over the surface. The boundary layer control apparatus includes a duct having an entrance positioned between the aircraft surface and the inlet of the propulsion nacelle for capturing the boundary layer air passing over the aircraft surface and diverting the boundary layer air away from the inlet.

In accordance with other aspects of this invention, the height of the entrance to the duct is approximately equal to the thickness of the boundary layer. Thus, the boundary layer is captured by the duct, rather than by the inlet of the propulsion nacelle, while minimizing the aerodynamic profile of the aircraft. In accordance with further aspects of this invention, the duct includes at least two conduits that divide the boundary layer air into separate air streams that are diverted to different locations away from the inlet of the propulsion nacelle.

In accordance with another aspect of this invention, the total cross-sectional area of the duct continually increases, from the entrance to the duct, moving rearwardly. In accordance with yet still other aspects of this invention, the cross-sectional area of each of the two conduits continually increases, from the entrance to each conduit, moving rearwardly. In accordance with yet further aspects of this invention, the conduits exit at a point external to the propulsion nacelle. In accordance with yet another aspect of this invention, the conduits exit into the nozzle of the propulsion nacelle. In accordance with yet further aspects of this invention, the propulsion nacelle includes a compartment having an engine, and the conduits exit into this compartment.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 4 is a partially exploded perspective view of a propulsion nacelle and a portion of wing of an airplane incorporating an alternative ducted boundary layer diverter formed in accordance with the present invention, wherein the diverted boundary layer air is exhausted into the nozzle;

FIG. 5 is a partially exploded perspective view of a propulsion nacelle and a portion of a wing of an airplane incorporating an alternative ducted boundary layer diverter formed in accordance with the present invention, wherein the diverted boundary layer air is exhausted into the engine compartment.

DETAILED DESCRIPTION OF THE PREFERRED EMBODIMENT

Figure 1:
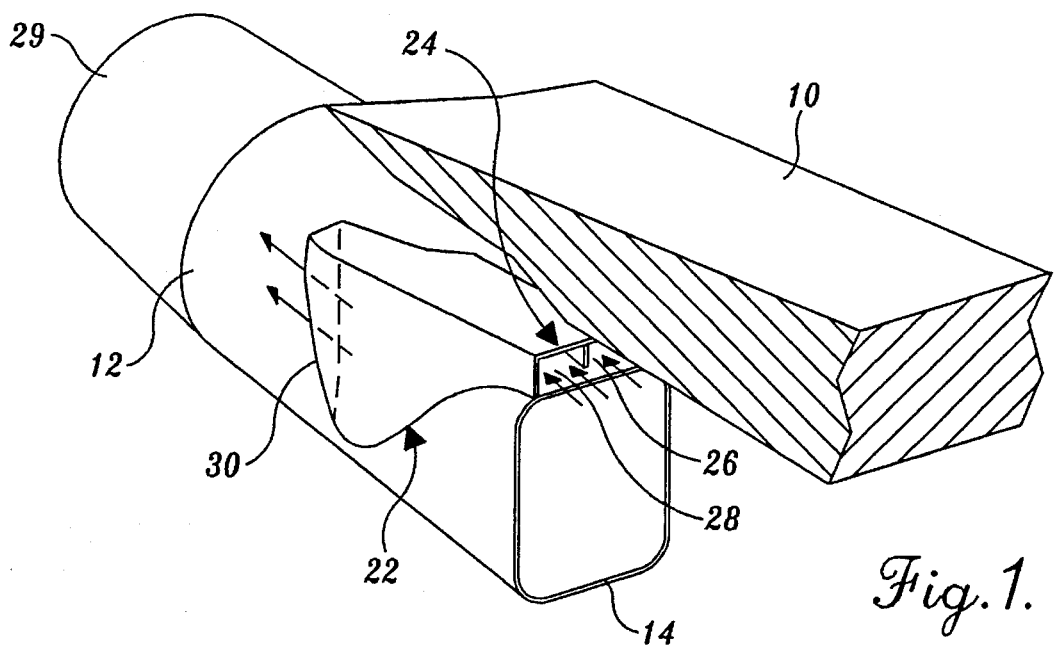
FIG. 1 is a perspective view of a propulsion nacelle and a portion of a wing of an airplane incorporating a ducted boundary layer diverter formed in accordance with the present invention, wherein the diverted boundary layer air is exhausted external to the propulsion nacelle.
Figure 2:
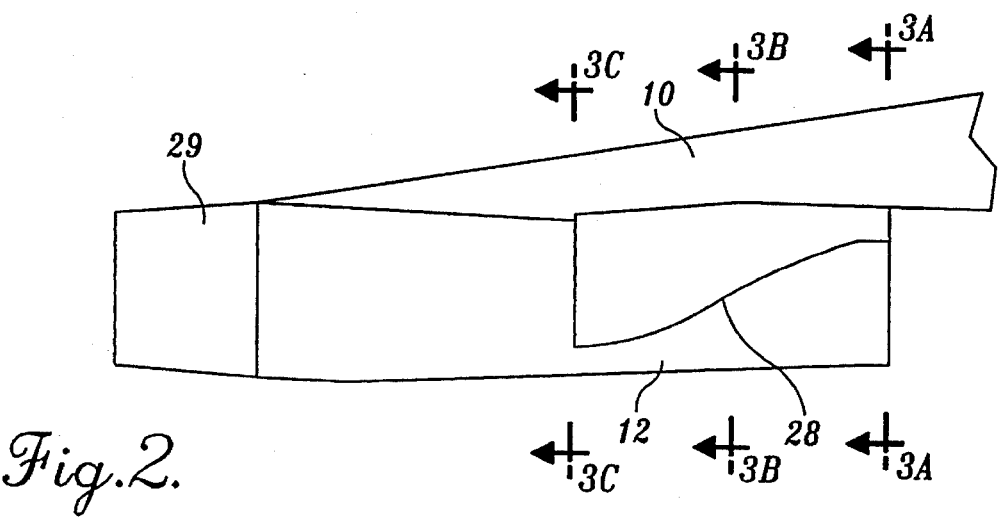
FIG. 2 is a side elevational view of the ducted diverter of FIG. 1 looking towards the fuselage (not shown) of the airplane.

FIGS. 1 and 2, depict a propulsion nacelle (or pod) 12 and part of a wing 10 incorporating a ducted boundary layer diverter 22 formed in accordance with the present invention. The propulsion nacelle 12 includes an inlet 14 at its forward end, and a nozzle 29 at its rearward end. Located internally within the propulsion nacelle 12, and therefore not shown, is an engine. The propulsion nacelle 12 is affixed to the trailing edge of the wing 10 and oriented such that the propulsion nacelle inlet 14 is located beneath the wing. The ducted boundary layer diverter 22 includes an opening 24 positioned between the wing 10 and the inlet 14 to the propulsion nacelle 12. Preferably, the height of the opening 24 is at least approximately equal to the thickness of the boundary layer air flowing across the lower surface of the wing 10. Thus, the boundary layer air flowing along the lower surface of the wing 10 in the region adjacent the propulsion nacelle inlet 14 is captured by the opening 24, rather than the propulsion nacelle inlet. Because the height of the opening 24 is not significantly greater than the height of the boundary layer, the effect of the opening 24 on the aerodynamic profile of the airplane is minimized.

From the opening 24, the ducted boundary layer diverter 22 splits into two conduits 26 and 28 located on opposite sides of the propulsion nacelle 12. The two conduits divide the boundary layer air into two separate air streams that flow along opposite sides of the propulsion nacelle 12 and exit on either side thereof.

Figures 3A, 3B, 3C:
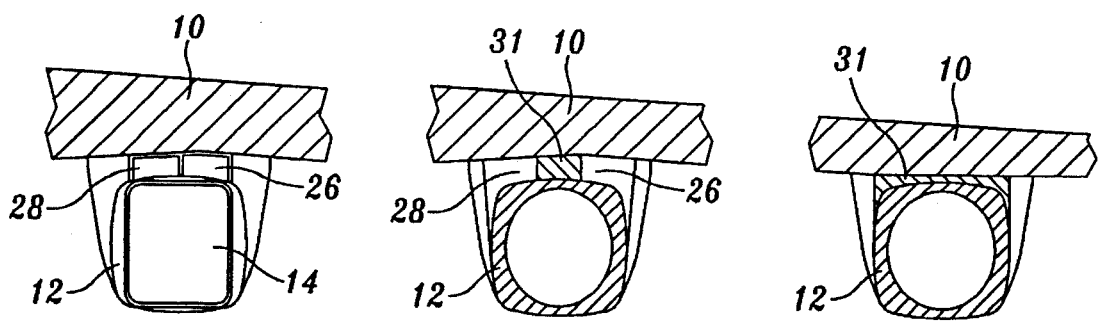
FIGS. 3A–C are a sequence of cross-sectional views taken along lines 3A—3A, 3B–3B, and 3C—3C of FIG. 2.

FIGS. 3A–3C are a series of progressive cross-sectional views of the ducted diverter 22 located along lines 3A—3A, 3B—3B, and 3C—3C of FIG. 2, starting from the opening 24 and moving towards the engine nozzle 29, illustrating the shape of the conduits 26 and 28 along the sides of the propulsion nacelle 12. As illustrated in FIG. 1, each conduit 26 and 28 includes a separate exit 30, located aft of the inlet 14, along the propulsion nacelle 12. Each conduit 26 and 28 exhausts the portion of the boundary layer it receives through its respective exit 30. As shown in FIGS. 1 and 2, the cross-sectional area of the conduits 26 and 28 increases in a rearward, or aft direction.

While the propulsion nacelle 12 can be attached to the wing 10 in any suitable manner, as shown in FIGS. 3A–3C, a strut 31 for attaching the propulsion nacelle to the wing can be located between the conduits 26 and 28. As also shown in FIGS. 3A–3C, the upper walls of the conduits 26 and 28 are shaped to conform to the lower surface of the wing 10. Preferably, the vertical outer walls of the conduits are aerodynamically shaped. The inner walls are configured to match the shape of the propulsion nacelle inlet 14 that they overlie. Alternatively, the inner walls may be defined by the outer surface of the propulsion nacelle 12. While shown as rectangular, the inlet 14 of the propulsion nacelle 12 can take on any desired shape. For example, the inlet could be circular.

An alternative embodiment of a ducted boundary layer diverter 32 constructed in accordance with the invention is shown in FIG. 4. More specifically, FIG. 4 is a perspective view of the alternative ducted boundary layer diverter incorporated into a propulsion nacelle 52 and wing 50 arrangement of the type shown in FIGS. 1–3 and described above. For clarity of illustration, the wing 50 and the nozzle 40 of the propulsion nacelle are shown exploded away from the main body of the propulsion nacelle 52. Exploding the wing 50 away from the propulsion nacelle 52 allows a better view of diverter conduits 34 and 36 that run along opposite sides of the propulsion nacelle 52.

The principal difference between the alternative ducted boundary layer diverter 32 shown in FIG. 4 and the ducted boundary layer diverter 22 shown in FIGS. 1–3 relates to where the conduits exit. Rather than exiting outside of the propulsion nacelle 52, the conduits 34 and 36 of the alternative ducted boundary layer diverter 32 shown in FIG. 4 extend to and cover ports 42 formed in opposite sides of the nozzle 40 of the propulsion nacelle. Thus, the boundary layer air carried by the conduits 34 and 36 is exhausted into the jet stream exiting the propulsion nacelle 52. The alternative ducted boundary layer diverter 32 shown in FIG. 4 is advantageous when used with engines that expand the jet supersonically to pressure levels low enough to accept the boundary layer air from the ducted boundary layer diverter.

As with the ducted boundary layer diverter 22 shown in FIGS. 1–3, the conduits 34 and 36 of the ducted boundary layer diverter 32 shown in FIG. 4 are formed so as to avoid sudden reductions in cross-sectional area, or severe turns that could reduce the air flow capacity of the conduits. If the conduits do not have air flow capacity adequate to divert all of the incoming boundary layer air, part of the boundary layer air is likely to flow into the inlet of the propulsion nacelle, reducing the performance of the engine.

Like the ducted boundary layer diverter 22 shown in FIGS. 1–3, the ducted boundary layer diverter 32 shown in FIG. 4 is formed such that the cross-sectional area of the conduits 34 and 36 continually increases from the openings into the conduits to the point where the ports 42 are located. Since the ducted boundary layer diverters 22 and 32 of both embodiments of the invention divide into separate conduits 26 and 28, or 34 and 36, respectively, the cross-sectional area for each conduit at identical distances aft of the inlet 54 are summed when calculating the total cross-sectional area of the conduits. As noted above, preferably, the cross-sectional area for each separate conduit 26 and 28 or 34 and 36 continually increases as one proceeds aft from the conduit entrance. This is clearly illustrated in FIG. 2, which is a side elevational view of ducted boundary layer diverter 22 shown in perspective in FIG. 1.

A continuous increase in cross-sectional area is important when speed of the air-flow through the diverlets 22 and 32 is in the supersonic range, because a reduction in cross-sectional area can "choke" a supersonic flow (reducing the flow velocity to mach one or less). Such a flow reduction could cause some of the boundary layer air to spill into the propulsion nacelle inlet 54, rather than flow through the diverter conduits.

Another alternative embodiment of a ducted boundary layer diverter 56 constructed in accordance with the invention is shown in FIG. 5. More particularly, FIG. 5 is a perspective view of the alternative ducted boundary layer diverter incorporated into a propulsion nacelle 58 and wing 60 arrangement of the type shown in FIGS. 1–4 and described above. For clarity of illustration, the wing 60 is shown exploded away from the main body of the propulsion nacelle 58. Exploding the wing 60 away from the propulsion nacelle 58 allows a better view of diverter conduits 62 and 64 that run along opposite sides of the propulsion nacelle 58.

The primary difference between the alternative ducted boundary layer diverter 56 shown in FIG. 5 and the ducted boundary layer diverters 22 and 32 shown in FIGS. 1–4 relates to where the conduits exit. Rather than exiting outside of the propulsion nacelle 58 or into the nozzle 66, the conduits 62 and 64 of the alternative ducted boundary layer diverter 56 shown cover ports 68 formed in opposite sides of the propulsion nacelle 58, forward of the nozzle 66. Thus, the boundary layer air carded by the conduits 62 and 64 is exhausted into the engine compartment through the ports 68. Within the engine compartment, the captured boundary layer air may then be used to cool engine accessories, or the engine itself, and then exhausted through the nozzle 66 of the propulsion nacelle 58.

As in the previously described embodiments of ducted boundary layer diverters 22 and 32 shown in FIGS. 1–4, the ducted boundary layer diverter 56 shown in FIG. 5 is formed such that the cross-sectional area of the conduits 62 and 64 continually increases from the openings into the conduits to the point where the ports 68 are located. Again, since all of the embodiments of the ducted boundary layer diverters 22, 32 and 56 divide into separate conduits, the cross-sectional area for each conduit at identical distances aft of the propulsion nacelle inlet is summed when calculating the total cross-sectional area of the conduits. Also as with previously described embodiments 22 and 32, preferably for alternative ducted boundary layer diverter 56 the cross-sectional area for each separate conduit 62 and 64 continually increases as one proceeds aft from the conduit entrance. As noted previously, a continuous increase in cross-sectional area is important to avoid "choking" a supersonic flow.

While preferred embodiments of the invention have been illustrated and described, it will be appreciated that various changes can be made therein without departing from the spirit and scope of the invention. For example, the embodiments of the invention shown in FIGS. 1–3, 4 and 5 depict ducted boundary layer diverters 22, 32 and 56 for a propulsion nacelle having its inlet positioned beneath the trailing edge of the wing of an airplane. The invention also applies to configurations where the propulsion nacelle inlet is in other locations. For instance, if the propulsion nacelle inlet is located adjacent to the fuselage of an airplane, then the entrance to the ducted diverters would be positioned between the fuselage and the inlet, rather than between the wing and the inlet, or possibly between both.

While the invention was designed for use with airplanes, particularly supersonic airplanes, it is to be understood that the invention could also be used with other aerospace vehicles sensitive to the ingestion of boundary layer air. For example, the invention could be incorporated in missile propulsion systems, or orbital vehicles having engines that require air during ascent or descent through a planetary atmosphere. Further, the invention may find use with engines other than airplane jet engines, such as supersonic combustion ram jet engines (also known as a SCRAM jet engines). Hence, within the scope of the appended claims, it is to be understood that the invention can be practiced otherwise than as specifically described herein.

The embodiments of the invention in which an exclusive property or privilege is claimed are defined as follows:

1. Boundary layer control apparatus for use with a propulsion nacelle positioned such that the air inlet of the propulsion nacelle is located adjacent an aircraft surface that establishes a boundary layer when the aircraft is propelled through an atmosphere, causing air to pass over said aircraft surface, said boundary layer control apparatus comprising, a duct means having an entrance positioned between said aircraft surface that establishes the boundary layer and said inlet of said propulsion nacelle for capturing the boundary layer air passing over said aircraft surface and diverting the boundary layer air away from the inlet.

2. The boundary layer control apparatus of claim 1, wherein said duct means includes at least two conduits that divide the boundary layer air into separate air streams that are diverted to different locations away from the inlet of said propulsion nacelle.

3. The boundary layer control apparatus of claim 2, wherein the height of the entrance of said duct means is approximately equal to the thickness of said boundary layer.

4. The boundary layer control apparatus of claim 3, wherein the total cross-sectional area of said conduits continually increases, moving rearwardly from said entrance.

5. The boundary layer control apparatus of claim 4, wherein the cross-sectional area of each of said conduits continuously increases, moving rearwardly from said entrance.

6. The boundary layer control apparatus of claim 5, wherein said conduits exit at a point external to the propulsion nacelle.

7. The boundary layer control apparatus of claim 5, wherein said propulsion nacelle includes an internal compartment having an engine and said conduits exit into said compartment.

8. The boundary layer control apparatus of claim 5, wherein said propulsion nacelle includes a nozzle and said conduits exit into the nozzle.

9. The boundary layer control apparatus of claim 1, wherein the height of the entrance of said duct means is approximately equal to the thickness of said boundary layer.

10. The boundary layer control apparatus of claim 9, wherein the total cross-sectional area of said duct means continually increases, moving rearwardly from said entrance.

11. The boundary layer control apparatus of claim 10, wherein said duct means exits at a point external to the propulsion nacelle.

12. The boundary layer control apparatus of claim 10, wherein said propulsion nacelle includes a compartment having an engine and said duct means exits into said compartment.

13. The boundary layer control apparatus of claim 10, wherein said propulsion nacelle includes a nozzle and said duct means exits into said nozzle.

14. The boundary layer control apparatus of claim 1, wherein the total cross-sectional area of said duct means continually increases, moving rearwardly from said entrance.

15. The boundary layer control apparatus of claim 14, wherein said duct means exits at a point external to the propulsion nacelle.

16. The boundary layer control apparatus of claim 14, wherein said propulsion nacelle includes a compartment having an engine and said duct means exits into said compartment.

17. The boundary layer control apparatus of claim 14, wherein said propulsion nacelle includes a nozzle and said duct means exits into said nozzle.

18. Boundary layer control apparatus for use with a propulsion nacelle positioned such that the air inlet of the propulsion nacelle is located adjacent an aircraft surface that establishes a boundary layer when the aircraft is propelled through an atmosphere, causing air to pass over said aircraft surface, said boundary layer control apparatus comprising a duct means having an entrance positioned between said aircraft surface that establishes the boundary layer and said inlet of said propulsion nacelle for capturing the boundary layer air passing over said aircraft surface and diverting the boundary layer air away from the inlet, wherein said duct means exits at a point external to the propulsion nacelle.

19. The boundary layer control apparatus of claim 1, wherein said propulsion nacelle includes a compartment having an engine and said duct means exits into said compartment.

20. Boundary layer control apparatus for use with a propulsion nacelle positioned such that the air inlet of the propulsion nacelle is located adjacent an aircraft surface that establishes a boundary layer when the aircraft is propelled through an atmosphere, causing air to pass over said aircraft surface, said boundary layer control apparatus comprising a duct means having an entrance positioned between said aircraft surface that establishes the boundary layer and said inlet of said propulsion nacelle for capturing the boundary layer air passing over said aircraft surface and diverting the boundary layer air away from the inlet, wherein said propulsion nacelle includes a nozzle and said duct means exits into said nozzle.

* * * * *